UNITED STATES PATENT OFFICE.

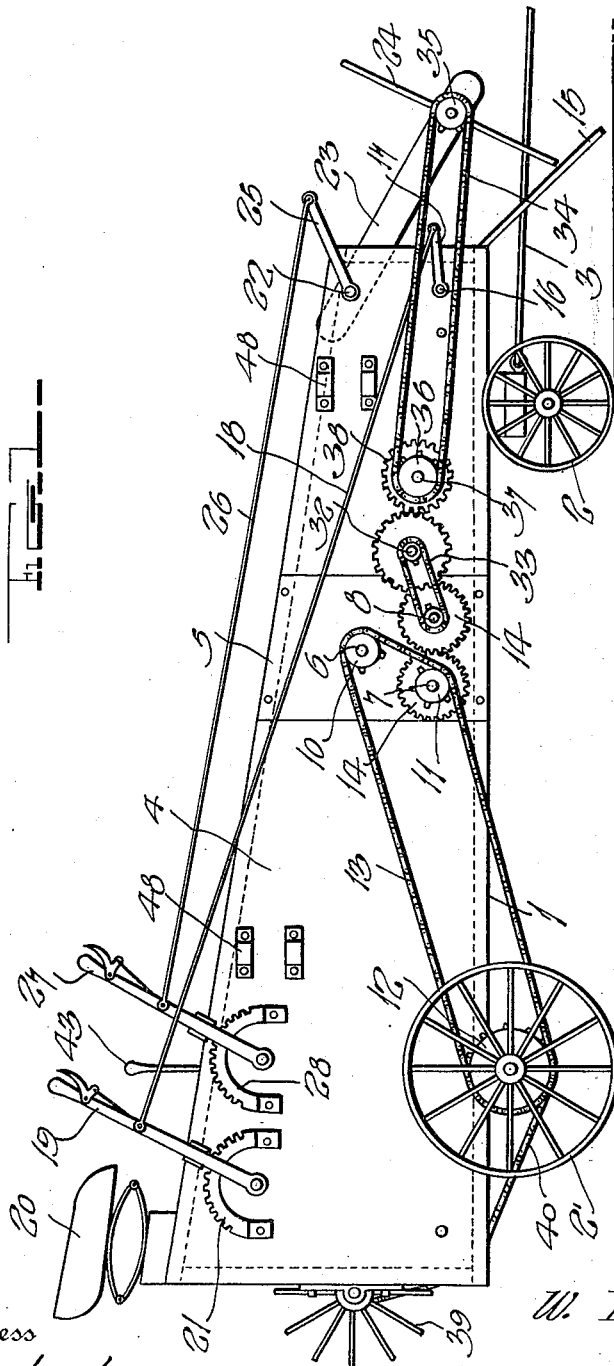

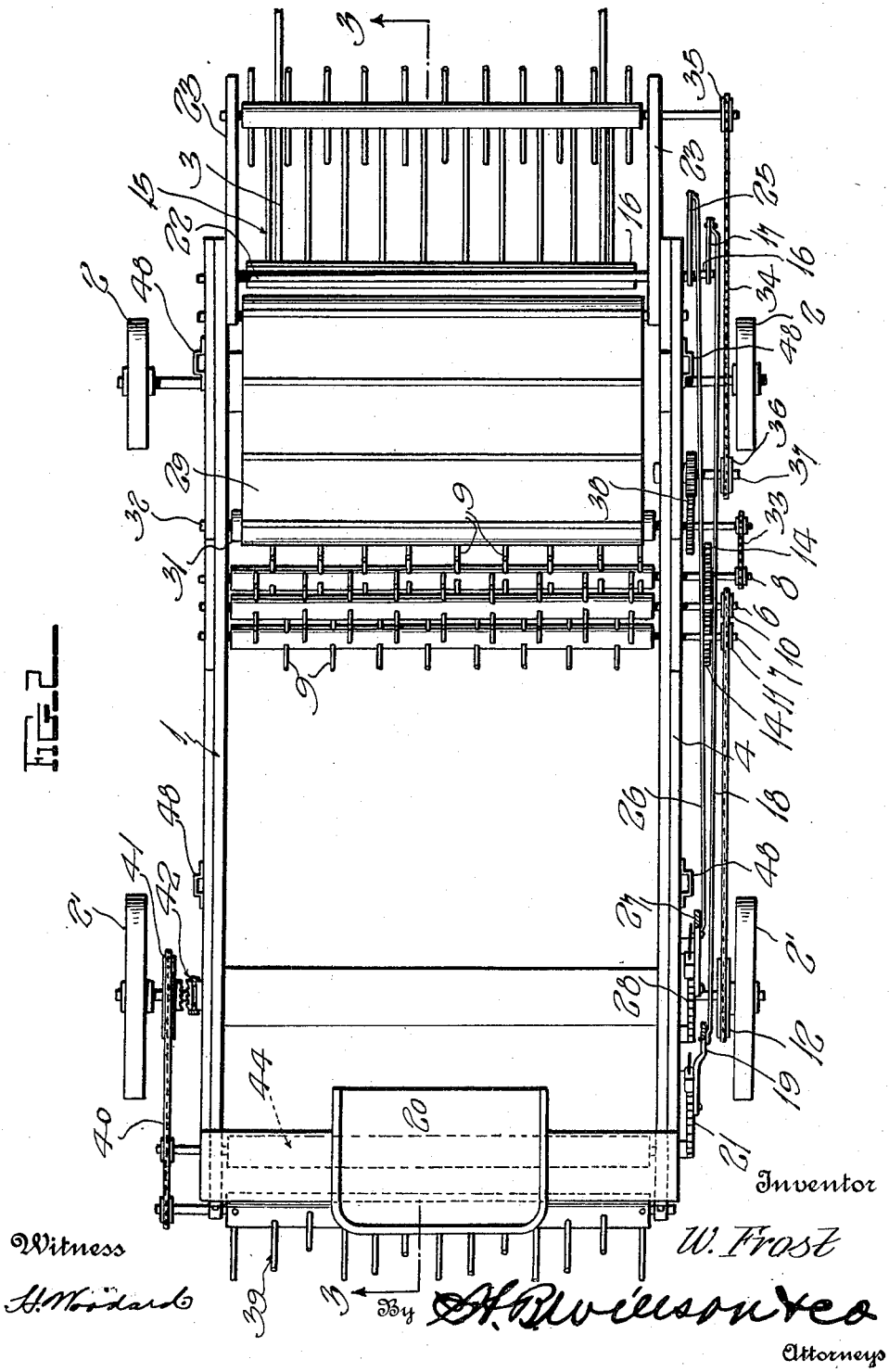

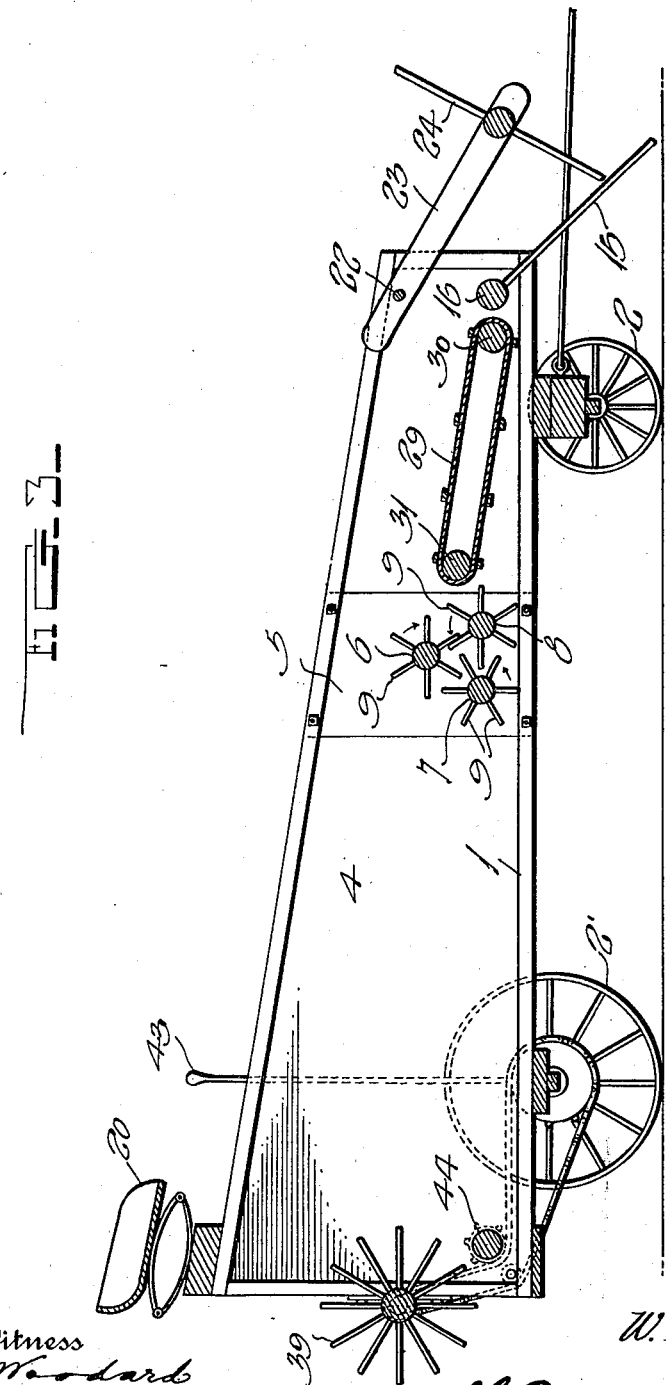

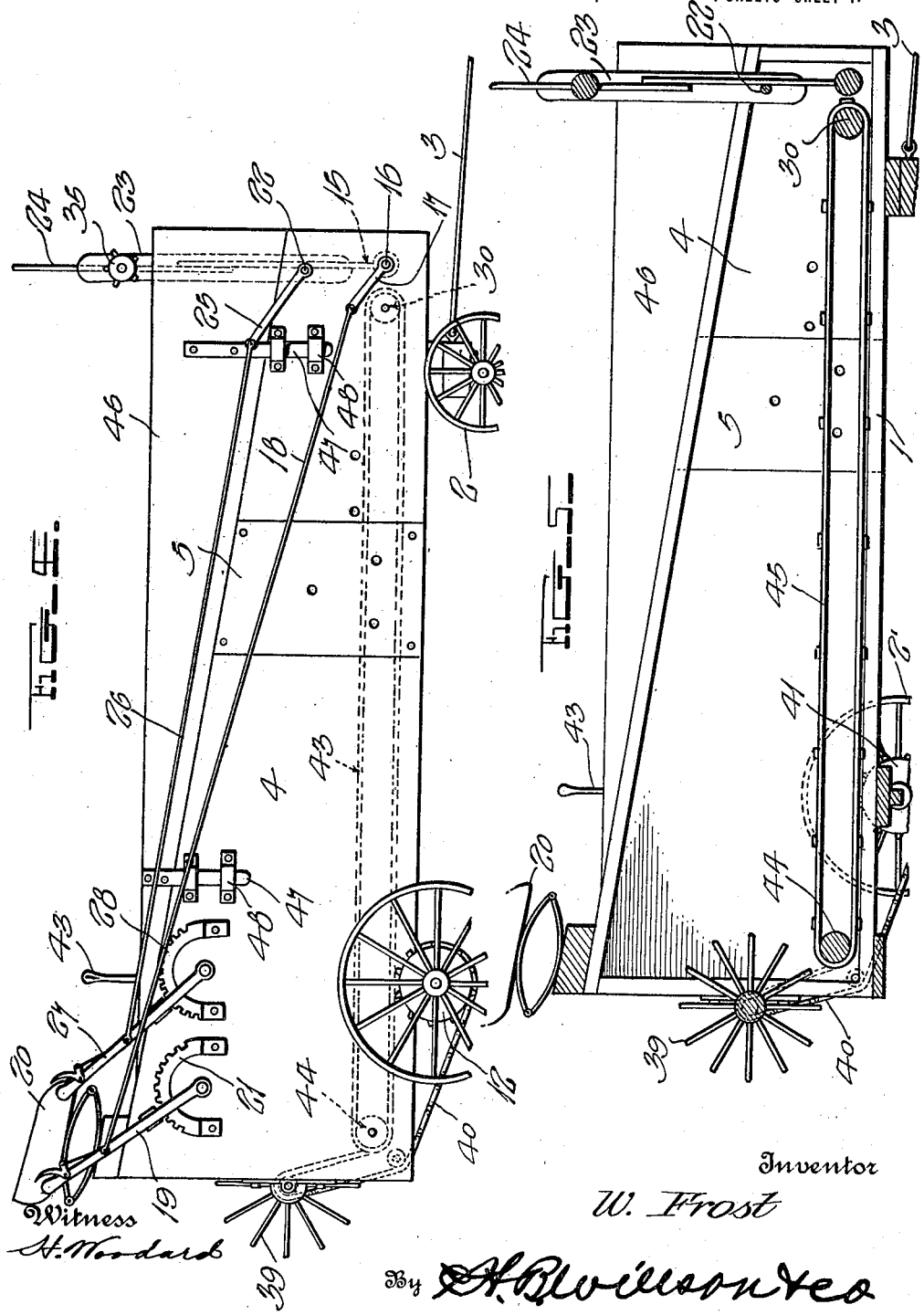

WILLIAM FROST, OF ATHENS, ILLINOIS, ASSIGNOR OF ONE-HALF TO JOSEPH FRANKLIN NULL, OF ATHENS, ILLINOIS.

CORNSTALK-RAKE.

1,276,205.  Specification of Letters Patent.  Patented Aug. 20, 1918.

Application filed October 29, 1917. Serial No. 199,124.

*To all whom it may concern:*

Be it known that I, WILLIAM FROST, a citizen of the United States, residing at Athens, in the county of Menard and State of Illinois, have invented certain new and useful Improvements in Cornstalk-Rakes; and I do declare the following to be a full, clear, and exact description of the invention, such as will enable others skilled in the art to which it appertains to make and use the same.

My invention has for its principal object to provide a simply constructed, yet a highly efficient machine for gathering corn stalks and the like from the ground, crushing or shredding said stalks, and redepositing the same upon the earth, whereby they may serve effectively as fertilizing means.

A further object is to provide a machine, which in addition to the use above set forth, may be readily employed as a manure spreader by making slight alterations.

Yet another object is to provide a number of novel features of construction which operate for different purposes, according to the use to which the machine is put.

With the foregoing general objects in view, the invention resides in the novel features of construction and unique combination of parts to be hereinafter fully described and claimed, the descriptive matter being supplemented by the accompanying drawings which form a part of this specification and in which:

Figure 1 is a side elevation of the improved machine arranged for gathering and shredding corn stalks and the like;

Fig. 2 is a top plan view;

Fig. 3 is a central longitudinal section on the plane of the line 3—3 of Fig. 2;

Fig. 4 is a side elevation showing the arrangement of parts when the machine is employed as a manure spreader and Fig. 5 is a longitudinal section of Fig. 4.

In the drawings above briefly described, the numeral 1 designates a base frame which is supported upon front and rear wheels 2 and 2' respectively, the former being mounted for horizontal turning and having a suitable draft device 3 connected to their axle, whereas the rear wheels 2' are utilized not only for supporting purposes, but for driving all working parts of the machine.

A pair of vertically disposed side members 4 rise from the sides of the frame 1 and by preference decrease in width toward their front ends, each of said side members including a removable or detachable section 5 having bearing openings in which three shafts 6, 7 and 8 are rotatably and removably received, all of said shafts extending across the space between the two side members 4 and having beater teeth 9 for crushing or shredding the corn stalks and the like as they are fed to the same. The three beaters are rotated in the directions shown by the arrows in Fig. 3, by the means illustrated most clearly in Fig. 1, said driving means including sprocket wheels 10 and 11 secured respectively on the shafts 6 and 7, a third sprocket wheel 12 secured on one of the rear wheels 2', and a sprocket chain 13 trained around the three sprockets, the two shafts 7 and 8 being operatively connected by spur gears or the like 14 so that the shaft 8 travels reversely from the shafts 6 and 7.

Although the driving mechanism above described is preferably employed on account of its simplicity and efficiency, it will be obvious that any other preferred driving connections could well be employed within the scope of the invention, the latter being not limited to such minor details of construction.

A downwardly and forwardly inclined gathering rake 15 is mounted on a transverse shaft 16 which extends between the front ends of the side members 5 and is rockably supported thereby, one end of said shaft having a crank arm 17 from which a link or the like 18 leads rearwardly to a hand lever 19 adjacent the driver's seat 20 which is positioned at the rear end of the machine, a suitable pawl and rack mechanism 21 being provided for locking the lever 19 in adjusted position, so that the rake 15 may be readily controlled. Immediately above the shaft 16, is a second transverse rock shaft 22, said last named shaft carrying a pair of forwardly extending rigid arms 23 by which a rotary feed member 24 is rotatably supported, said member serving to force the corn stalks and the like upwardly along the rake 15 as they are collected from the earth by the latter. As the character of the work being performed, necessitates that the feed member 24 be adjusted vertically at times, one end of the shaft 22 is shown provided with a crank arm 25 from which a link 26 leads rearwardly to a hand lever 27 within easy reach of the driver's seat 20, a suitable pawl and rack mechanism 28 being employed for locking lever 27 in adjusted position.

The operation of the machine so far described, is as follows:

The entire device is drawn or propelled forwardly over the field with the fork or rake 15 in lowered position, said fork or rake serving to gather all corn stalks or the like from the ground to convey them upwardly, this action being assisted by the rotary feed member 24. From the rake 15, the material is deposited upon a belt conveyer 29 which is trained around front and rear transverse rollers 30 and 31, said conveyer carrying the corn stalks and the like rearwardly and depositing them between the rapidly rotating beaters above described, so that they are shredded by said beaters and thrown downwardly upon the earth in the form of fine mulch, which will become an effective fertilizer as decomposition takes place.

Any preferred means may well be employed for driving the rotary member 24 and the feed apron 29, but the following construction is preferably employed. The shaft 32 of the roller 31 is driven by sprocket wheels and a sprocket chain 33 from the shaft 8, said shaft 32 in turn imparting rotary movement to the member 24, by any suitable driving connections. For illustrative purposes, a chain 34 is shown trained around a sprocket 35 on the shaft of the member 24, and around an additional sprocket 36 mounted rotatably on a short stub shaft 37, said sprocket 36 being driven by intermeshing spur gears 38, one of which is carried on the shaft 32.

As above pointed out, it is intended that the machine shall be used as a spreader when required, and to this end a rotary beater or distributer 39 is provided at the rear end of the body, said beater or distributer being driven by a sprocket chain 40 which passes around a sprocket wheel 41, the latter being driven by one of the rear wheels 2' and having a suitable clutch 42 actuated by a hand lever or the like 43, so that the beater 39 may be driven whenever required. The chain 40 also drives a rear transverse roller 44, it being around this roller and the front roller 30 above described, that an endless belt or feed apron 45 is trained, when the machine is to be employed for spreading purposes, the three shafts 6, 7 and 8 and their driving means being then removed, as is also the roller 31 and the conveyer 29, (see more particularly Figs. 4 and 5).

When spreading is to be done, the side members 4 are preferably increased in height by applying a pair of triangular upper sections 46 thereto, said sections having depending stakes 47 which are removably received in suitable guides 48 carried by said members 4. By the provision of the extension members 46, the machine may carry a larger load than would otherwise be possible, and in order to prevent the material from falling from the front end of the body, it is necessary to provide some suitable means. This necessity is met by the novel mounting of the rake 15 and the rotary feed member 24, both of these parts being movable vertically to the position shown in Figs. 4 and 5, by simply pulling rearwardly upon the hand levers 19 and 27. By this double function of the members 15 and 24, it is obvious that the construction of the machine is greatly simplified, since if this arrangement were not employed, an additional end gate or the like would necessarily be employed. On account of these advantages, therefore the novel features of construction under discussion, constitute a salient part of the invention.

When the machine is to be used as a spreader, the rotary beater of the shafts 6, 7 and 8 are detached by removing the side sections, the apron 29 and its rollers 31 being also detached. These preliminaries having been carried out, the belt or apron 45 is trained around the rollers 44 and 30, whereupon the machine is in condition for use. By actuating the lever 43, the clutch 42 may be thrown into operative position so that the roller 44 and the beater 39 will be driven, to feed the material rearwardly and distribute it over the earth. It will be understood that the beater or distributer 39 is shown for illustrative purposes only and that any of the well known equivalent devices could be employed should occasion so demand.

From the foregoing, taken in connection with the accompanying drawings, it will be obvious that although the improved machine is of staple and inexpensive construction, it will be highly efficient when used either as a corn stalk rake and shredder or as a manure spreader. Due to this double use of the machine, it is unnecessary to provide different machines for the two purposes and thus the owner is not only put to less expense, but less storage room is required.

Since probably the best results are obtained from the several specific features of construction shown and described, such features are by preference employed. It is to be understood, however, that within the scope of the claimed invention, numerous minor changes may well be made without sacrificing the principal advantages.

I claim:

1. A convertible machine of the class described comprising a portable body, a rake at the front end of said body for gathering material from the earth and supplying the same to said body, said rake being movable upwardly to assist in forming an end gate for said body, and a vertically movable feed member coacting with said rake when gathering, and forming with said rake an end gate when the two are raised.

2. A convertible machine of the class described, including a body and a rake at the front end thereof for gathering material from the earth and supplying the same to said body, said rake being movable vertically to form an end gate for the body; together with a rotary feed member coacting with said rake when the latter is performing either of its functions, said feed member being mounted on a pair of vertically swinging arms whereby it may be moved to either raised or lowered position.

In testimony whereof I have hereunto set my hand in the presence of two subscribing witnesses.

WILLIAM FROST.

Witnesses:
Y. H. PITTMAN,
EDW. C. MANDEL.

Copies of this patent may be obtained for five cents each, by addressing the "Commissioner of Patents, Washington, D. C."